(12) United States Patent
Choung et al.

(10) Patent No.: US 6,487,195 B1
(45) Date of Patent: *Nov. 26, 2002

(54) COLLABORATIVE NETWORK NAVIGATION SYNCHRONIZATION MECHANISM

(75) Inventors: Byung-Sun Choung; Robert Gula, both of San Diego, CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/735,476

(22) Filed: Oct. 23, 1996

(51) Int. Cl.$^7$ .......................... H04L 12/28; G06F 17/00
(52) U.S. Cl. ...................................... 370/352; 709/204
(58) Field of Search ................................ 370/400, 401, 370/352, 355; 395/200.48, 200.36, 500, 200.49, 200.59, 200.79, 200.53, 200.57, 200.54, 200.3, 200.33; 364/280.4, 280.6, 282.4; 1/1; 709/227, 218, 202, 229, 203, 204, 206

(56) References Cited

U.S. PATENT DOCUMENTS

| | | | |
|---|---|---|---|
| 3,725,866 A | 4/1973 | Oldfield, Jr. et al. ....... 709/227 |
| 4,064,490 A | 12/1977 | Nagel ......................... 709/227 |
| 5,165,020 A | 11/1992 | Sudama et al. ............. 709/227 |
| 5,546,455 A | 8/1996 | Joyce et al. ................. 379/265 |
| 5,644,720 A | 7/1997 | Boll et al. ................... 709/227 |
| 5,764,916 A | * 6/1998 | Busey et al. ............ 395/200.33 |
| 5,774,660 A | * 6/1998 | Brendel et al. ......... 395/200.33 |
| 5,790,792 A | * 8/1998 | Higley .................... 395/200.48 |
| 5,809,247 A | 9/1998 | Richardson et al. ........ 709/218 |
| 5,812,552 A | * 9/1998 | Arora et al. ................. 370/401 |
| 5,862,330 A | * 1/1999 | Anupam et al. ....... 395/200.34 |
| 5,956,038 A | * 9/1999 | Junichi |

FOREIGN PATENT DOCUMENTS

WO    WO 96/31826    10/1996

OTHER PUBLICATIONS

Jacobs, S. et al: "Filling HTML forms simultaneously: CoWeb –architecture and functionality" Computer Networks and ISDN Systems, NL, North Holland Publishing. Amsterdam, vol.28, No. 11, May 1, 1996, pp. 1385–1395, XP004018236, ISSN: 0169–7552.

Frivold, T. J. et al: "Extending WWW for synchronous collaboration" Computer Networks and ISDN Systems, NL, North Holland Publishing , Amsterdam, vol. 28, No. 1, Dec. 1, 1995, pp. 69–75, XP004001212, ISSN: 0169–7552.

Kamiya, K. et al: "Grassroots: A System Providing a Uniform Framework For Communicating, Structuring, Sharing Information, and Organizing People" Computer Networks and ISDN Systems, NL, Amsterdam, vol. 28, No. 11, May 1, 1996, pp. 1157–1174, XP002039536, ISSN: 0169–7552.

\* cited by examiner

*Primary Examiner*—Steven Nguyen
*Assistant Examiner*—Phuongchau Ba Nguyen
(74) *Attorney, Agent, or Firm*—Ying Tuo; Lowe Hauptman Gopstein Gilman & Berner, LLP

(57) ABSTRACT

A web site server provides collaborative web page navigation feature for a group of user terminals. The location information of the web pages are relayed to all following terminals of the group, while a leading terminal of the group is navigating through the web pages by using its web browser. Each of the following terminals has a web navigation synchronizer. Upon receiving the web page location information, the web navigation synchronizer updates its respective web browser and activates the browser to locate web pages according to the web page location information.

17 Claims, 13 Drawing Sheets

COLLABORATIVE NETWORK NAVIGATION SYNCHRONIZATION MECHANISM

BACKGROUND OF THE INVENTION

The present invention relates generally to a method and apparatus for getting access to web sites by a group of users.

It is known that users can retrieve information from World Wide Web sites (or web sites) via the Internet. The basic current model for retrieving information from web sites is user initiated information searching. A person uses web browser software to request a web page from a web server software to locate the information relating to that web page. Very much like finding desired Internet bulletin boards, the person seeking information actively searches for it. One of the unique features of this model is the notion of "hypertext," or links, embedded in web pages that have been retrieved. This feature enables the person in search for information to "navigate" from one web page to another. The tremendous popularity of World Wide Web sites and Internet attests to the effectiveness of this model.

However, with the current model, the information search heavily depends on individual's knowledge, experience, skills, and expertise. Unless a group of people physically gathers around a single PC screen, the information retrieved from web sites is limited to the person who is navigating. If the information retrieved needs to be shared within a group of people, the person who has conducted the information search relays them the web page addresses that contain the information. The group of people then retrieve the information according to the web page addresses. Clearly, such an approach for sharing navigation experience and information among a group of people is slow, inconvenient, inefficient, and prone to errors.

Therefore, it is desirable to propagate network navigation experience and information among a group of people who are geographically dispersed.

To enable the propagation of network navigation experience and information among a group of people who are geographically dispersed, there is a need for a method and apparatus to track and synchronize the network navigation with convenience, efficiency, and accuracy.

The present invention meets this need.

SUMMARY OF THE INVENTION

In one aspect, the invention provides a method for locating information from a plurality of information repositories via a network for a group of terminals. The method comprises the steps of:

(a) via the network, locating an information section in one of said information repositories by one of said group of terminals;

(b) at said one terminal, collecting location information of said information section; and (c) via the network, sending said location information from said one terminal to the other terminals of said group of terminals.

In another aspect, the invention provides a method for locating information via a network for a group of terminals, the group of terminals being able to get access to an information repository via the network. The method comprises the steps of:

(a) via the network, receiving a request from one of said group terminals, to locate an information section in said information repository;

(b) collecting location information of said information section at the side of said information repository; and (c) via the network, sending said location information from said one terminals to the other terminals of said group of terminals.

The present invention also provides corresponding apparatus or system for the respective aspects mentioned above.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
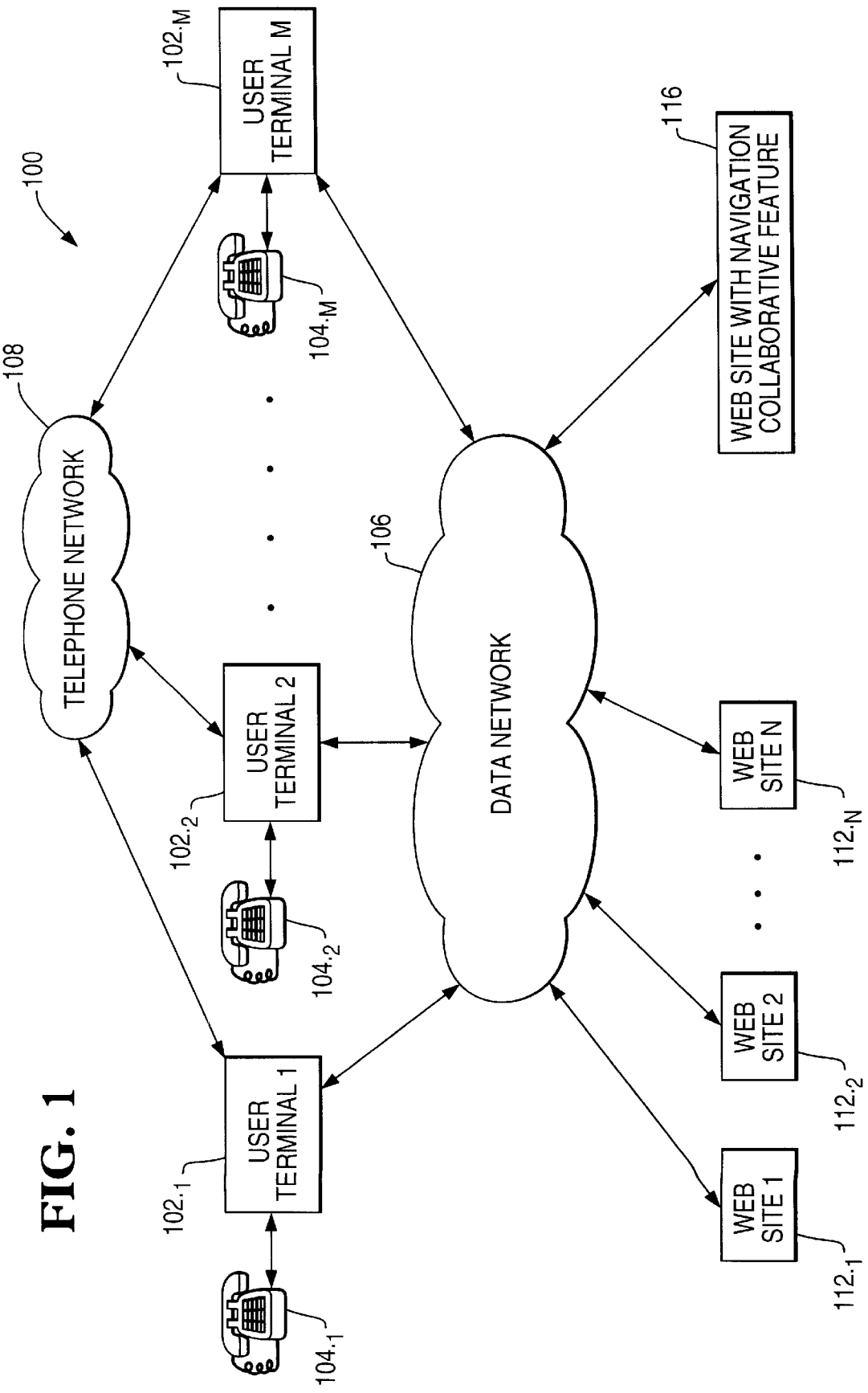
FIG. 1 shows an exemplary data network configuration 100, in accordance with the present invention.

Referring to FIG. 1, there is shown an exemplary data network configuration 100, in accordance with the present invention.

As shown in FIG. 1, the data network configuration includes a plurality of novel user terminals (102.$_1$, 102.$_2$, . . . , 102.$_M$), a plurality of conventional web sites (112.$_1$, 112.$_2$, . . . , 112.$_N$), and a novel web site (116) with network collaborative feature. Coupled to the plurality of user terminals (102.$_1$, 102.$_2$, . . . , 102.$_M$) are plurality of telephone sets (104.$_1$, 104.$_2$, . . . , 104.$_M$), respectively.

Each of the user terminals (102.$_1$, 102.$_2$, . . . , 102.$_M$) has the network navigation collaborative feature and can be used to get access to the web sites (112.$_1$, 112.$_2$, . . . , 112.$_N$, and 116), via data network 106. The users of the terminals (102.$_1$, 102.$_2$, . . . , 102.$_M$) can orally communicate with each other by using respective telephone sets (104.$_1$, 104.$_2$, . . . , 104.$_M$).

Each of the web sites (112.$_1$, 112.$_2$, . . . , 112.$_N$) is able to process web requests from the user terminals.

In addition to processing web requests from user terminals, web site (116) with network collaborative navigation feature is able to track, synchronize web navigation, and manage a navigation session, among the user terminals.

Figure 2:
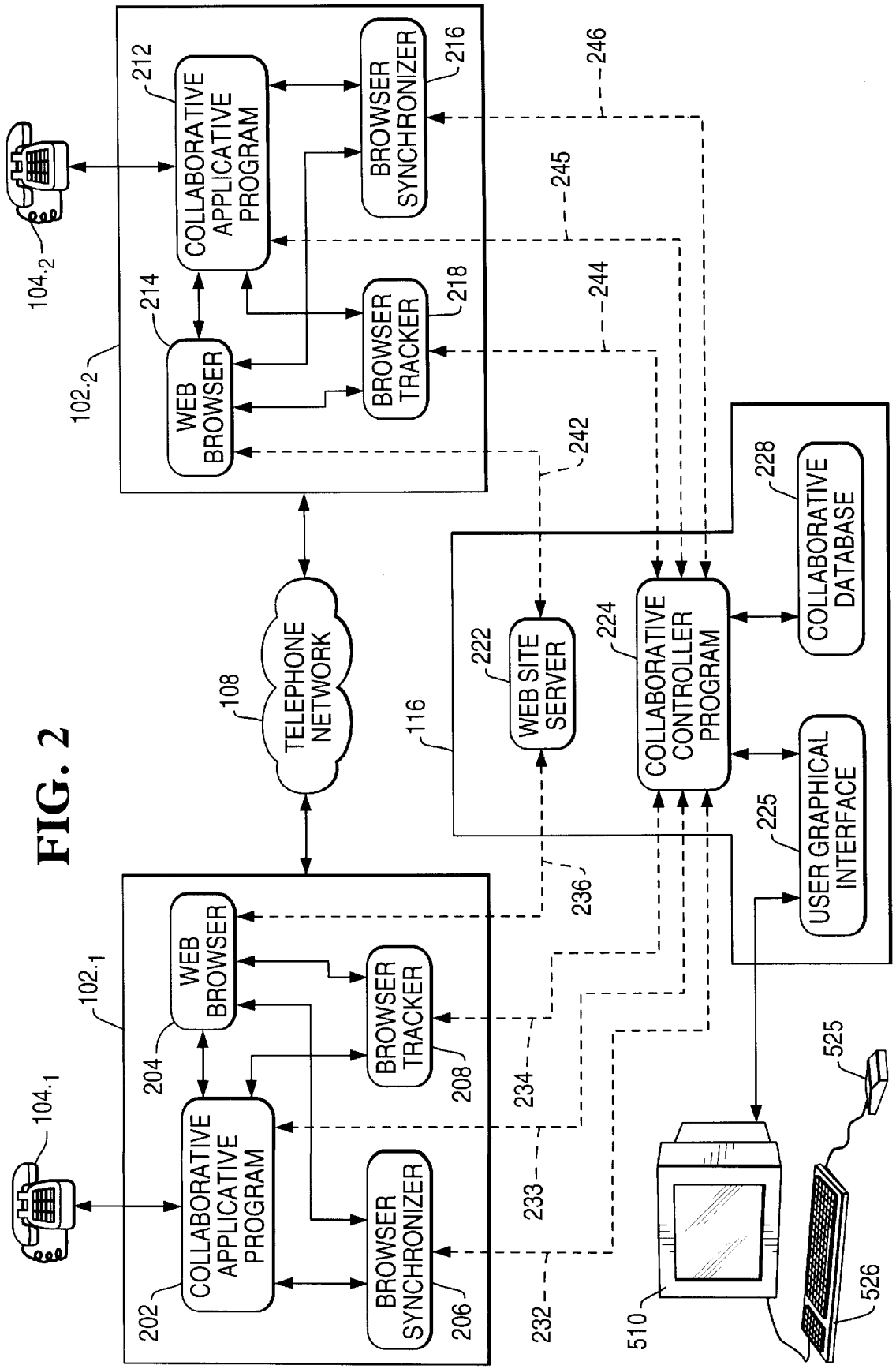
FIG. 2 shows two of the user terminals ($102_{-1}$, $102_{-2}$) and web site (116) of FIG. 1 in greater detail, in accordance with one embodiment of the present invention.

Referring to FIG. 2, there are shown two of the user terminals (102.$_1$, 102.$_2$) and web site (116) with the network navigation collaborative feature in greater detail, in accordance with one embodiment of the present invention.

As shown in FIG. 2, user terminal 102.$_1$ includes four software function blocks, namely: collaborative application program 202, web browser 204, browser synchronizer 206, and browser tracker 208. Symmetrically to user terminal 102.$_1$, user terminal 102.$_2$ also includes four software function blocks, namely: collaborative application program 212, web browser 214, browser synchronizer 216, and browser tracker 218. Web site 116 includes four software function blocks, namely: web site server 222, collaborative controller program 224, user graphical interface 225, and collaborative database 228.

Collaborative application program 202 (or 212) is able to provide software interface for the communication between terminal 202 (or 212) and other terminals. Collaborative application program 202 (or 212) is also able to coordinate the operations among web browser 204, browser synchronizer 206, and browser tracker 208. Collaborative application program 202 (or 212) is further able to provide session definitions and create session lists.

Web browser 204 (or 214) is able to generate web page request to web sites and displays web pages retrieved.

Browser synchronizer 206 (or 216) is able to perform synchronization process for browser 204 (or 214). Specifically, browser synchronizer 206 (or 216) receives synchronization commands and web site location information from collaborative controller program 224, and requests web browser 204 (or 214) to display the synchronized web page.

Browser tracker 208 (or 218) is able to collect from web browser 204 (or 214) the web site location information of the web page that has been navigated by browser 202 (or 212), and send the location information to collaborative controller program 224 via data network 106.

Web site server 222 is able to process web page requests from web browsers in user terminals 102.$_1$, 102.$_2$, . . . , 102.$_M$.

Collaborative controller program 224 is able to gather session definitions and session lists from collaborative applications programs in user terminals 102.$_1$, 102.$_2$, . . . , 102.$_M$, to gather navigation tracking information from the browser trackers in user terminals 102.$_1$, 102.$_2$, . . . , 102.$_M$, to send navigation synchronization commands and web site location information for desired web pages to the browser synchronizers in user terminals 102.$_1$, 102.$_2$, . . . , 102.$_M$, and to pass the session definition and navigation tracking information into collaborative database 228.

User graphical interface 225 is able to provide an interface between a user and collaborative controller program 224. With user graphical interface 225, a user can communicate with collaborative controller program 224 by using display monitor 510, keyboard 524 and mouse 526.

Collaborative database 228 is able to store the session related information and navigation tracking information.

Figure 3:
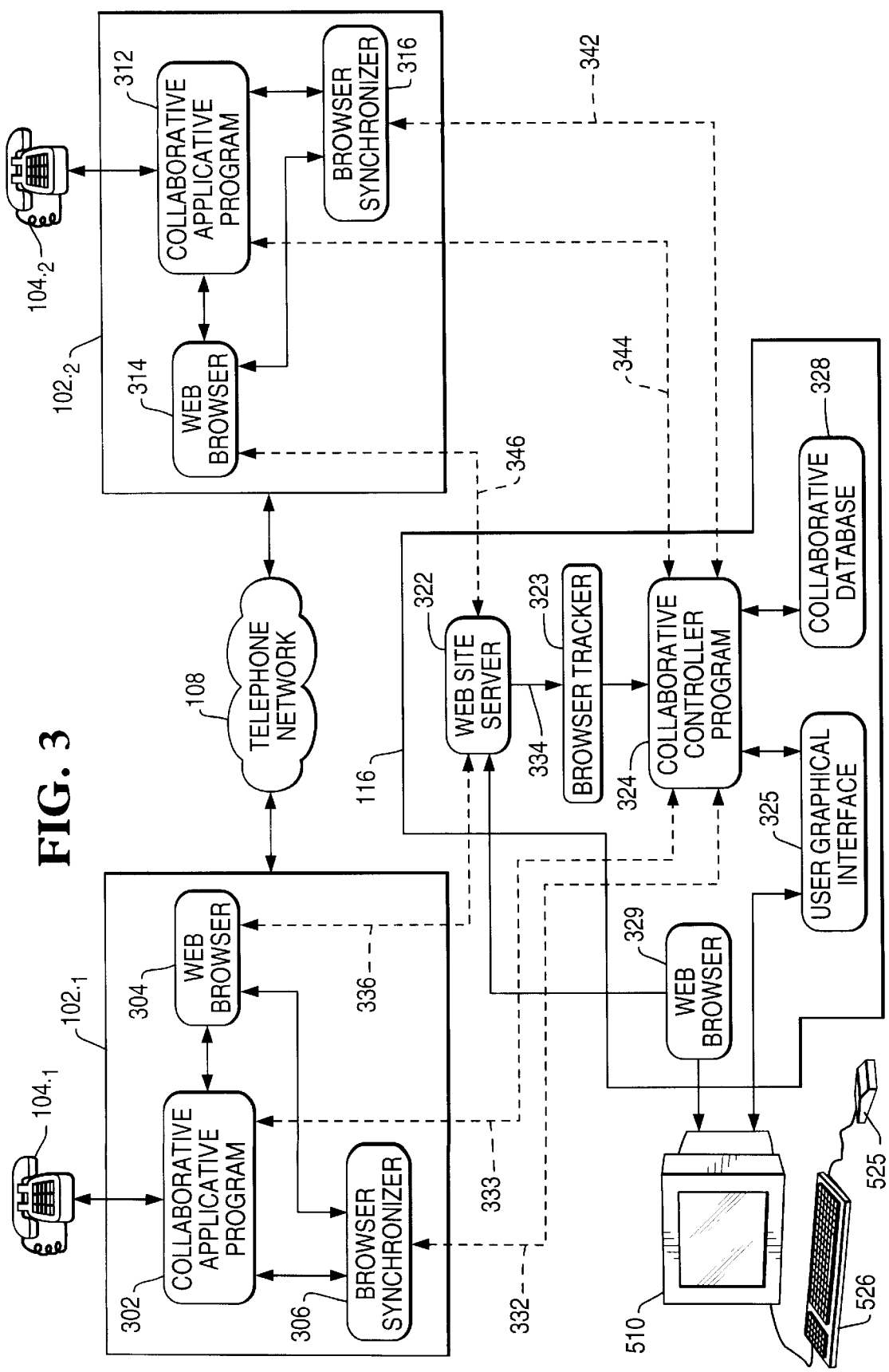
FIG. 3 shows two of the user terminals ($102_{-1}$, $102_{-2}$) and web site (116) of FIG. 1 in greater detail, in accordance with another embodiment of the present invention.

Referring to FIG. 3, there are shown two of the user terminals (102.$_1$, 102.$_2$) and web site (116) with the network navigation collaborative feature in greater detail, in accordance with another embodiment of the present invention.

As shown in FIG. 3, user terminal 102.$_1$ includes three software function blocks, namely: collaborative application program 302, web browser 304, and browser synchronizer 206. Symmetrically to user terminal 102.$_1$, user terminal 102.$_2$ also includes three software function blocks, namely: collaborative application program 312, web browser 314, and browser synchronizer 216. Web site 116 includes five software function blocks, namely: web site server 322, browser tracker 323, collaborative controller program 324, collaborative database 328, and web browser 329.

Collaborative application program 302 (or 312) is able to able to provide software interface for the communication between terminal 302 (or 312) and other terminals. Collaborative application program 302 (or 312) is also able to coordinate the operations among web browser 304, browser synchronizer 306, and browser tracker 308. Collaborative application program 302 (or 312) is further able to provide session definitions and create session lists.

Web browser 304 (or 314) is able to generate web page request to web sites and displays web pages retrieved.

Browser synchronizer 306 (or 316) is able to perform synchronization process for browser 304 (or 314). Specifically, browser synchronizer 306 (or 316) receives synchronization command from collaborative controller program 324 via data network 106, and requests web browser 304 (or 314) to display the synchronized web page.

Web site server 322 is able to process web page requests from web browsers in user terminals 102.$_1$, 102.$_2$, . . . , 102.$_M$.

Browser tracker 323 is able to collect web page location information from all web page requests that have been sent to web site 116 and send the page location information to collaborative controller program 324.

Collaborative controller program 324 is able to gather session definitions and session lists from collaborative applications programs in user terminals 102.$_1$, 102.$_2$, . . . , 102.$_M$, to gather navigation tracking information from the browser tracker 323 in web site 116, to send navigation synchronization commands web site location information for desired web pages to the browser synchronizers in user terminals 102.$_1$, 102.$_2$, . . . , 102.$_M$, and to pass the session definition and navigation tracking information into collaborative database 328.

User graphical interface 325 is able to provide an interface between a user and collaborative controller program 324. With user graphical interface 325, a user can communicate with collaborative controller program 324 by using display monitor 510, keyboard 524 and mouse 526.

Collaborative database 328 is able to store the session related information and navigation tracking information.

Web browser 329 is able to directly send web page request to web server 322 and displays web pages retrieved, so that monitor 510, mouse 525 and key board 526 in FIG. 3 can act as a leading terminal or a following terminal in a session. The advantage of directly connecting a leading terminal to web site server 322 without using data network 106 is that the time delay of displaying web pages between the leading terminal and following terminals can be minimized.

In FIGS. 2 and 3, dotted lines indicate logical communication paths between software function blocks.

Figure 4:
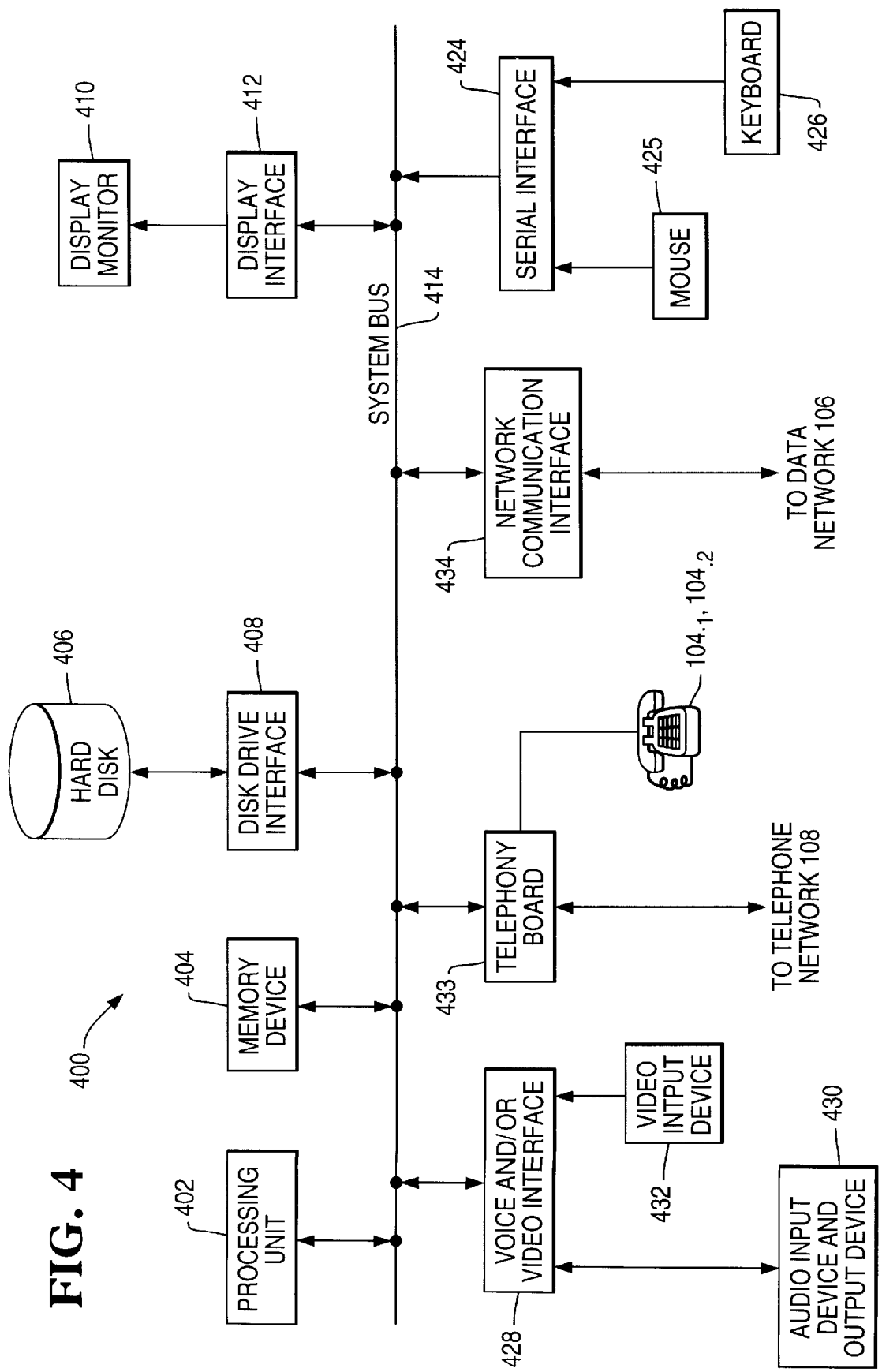
FIG. 4 shows a hardware block diagram of a typical user terminal in FIG. 1, in accordance with the present invention.

Referring to FIG. 4, there is shown a hardware block diagram of a computer system 400, which can be used as a user terminal, such as $102._1$ or $102._2$, in accordance with the preset invention.

As shown in FIG. 4, user terminal $102._1$ (or $102._2$) comprises a processing unit 402, a memory device 404, a hard disk 406, a disk drive interface 408, a display monitor 410, a display interface 412, a serial interface 424, a mouse 425, a keyboard 426, a voice and/or video interface 428, audio input and output device 430, video input device (such as video camera) 432, a telephony board 433, a network communication interface 434, and a system bus 414.

Hard disk 406 is coupled to disk drive interface 408; display monitor 410 is coupled to display interface 412; mouse 425 and keyboard 426 are coupled to serial interface 424; and audio input and out device 430 and video input device 432 are coupled to voice and/or video interface 428. Coupled to system bus 414 are: processing unit 402, memory device 404, disk drive interface 408, display interface 412, serial interface 424, voice and/or video interface 428, telephony board 433, and network communication interface 434.

Memory device 404 is able to store programs (including instructions and data). Operating together with disk drive interface 408, hard disk 406 is also able to store programs. However, memory device 404 has faster access speed than hard disk 406, while hard disk 406 has higher capacity than memory device 404.

Operating together with display interface 412, display monitor 410 is able to provide visual interface between programs being executed and a user.

Operating together with serial interface 424, mouse 425 and keyboard 426 are able to provide inputs to computer system 400.

Operating together with voice and/or video interface 428, voice input and output device 430 is able to generate, send and receive audio signals, through network communication interface 434. Video input device 432 is able to generate and send video signals through network communication interface 434.

Telephony board 433 is able to provide an interface between telephone network 108 and computer 400. More specifically, telephony board 433 allows the telephone communication program resided within collaborative application programs (e.g. 202, 212) to initiate and receive phone calls.

Network communication interface 434 is able to provide an interface between computer 400 and data network 106. More specifically, all software function blocks as shown in FIGS. 2 and 3 get access to data network 106 via network communication interface 434 in compliance with pre-determined network protocols.

Processing unit 402 has access to memory device 404 and hard disk 406, and is able to control operations of user terminal $102._1$ (or $102._2$) by executing programs stored in memory device 404 or hard disk 406. Processing unit 402 is also able to control the transmissions of programs and data between memory device 404 and hard disk 406.

Figure 5:
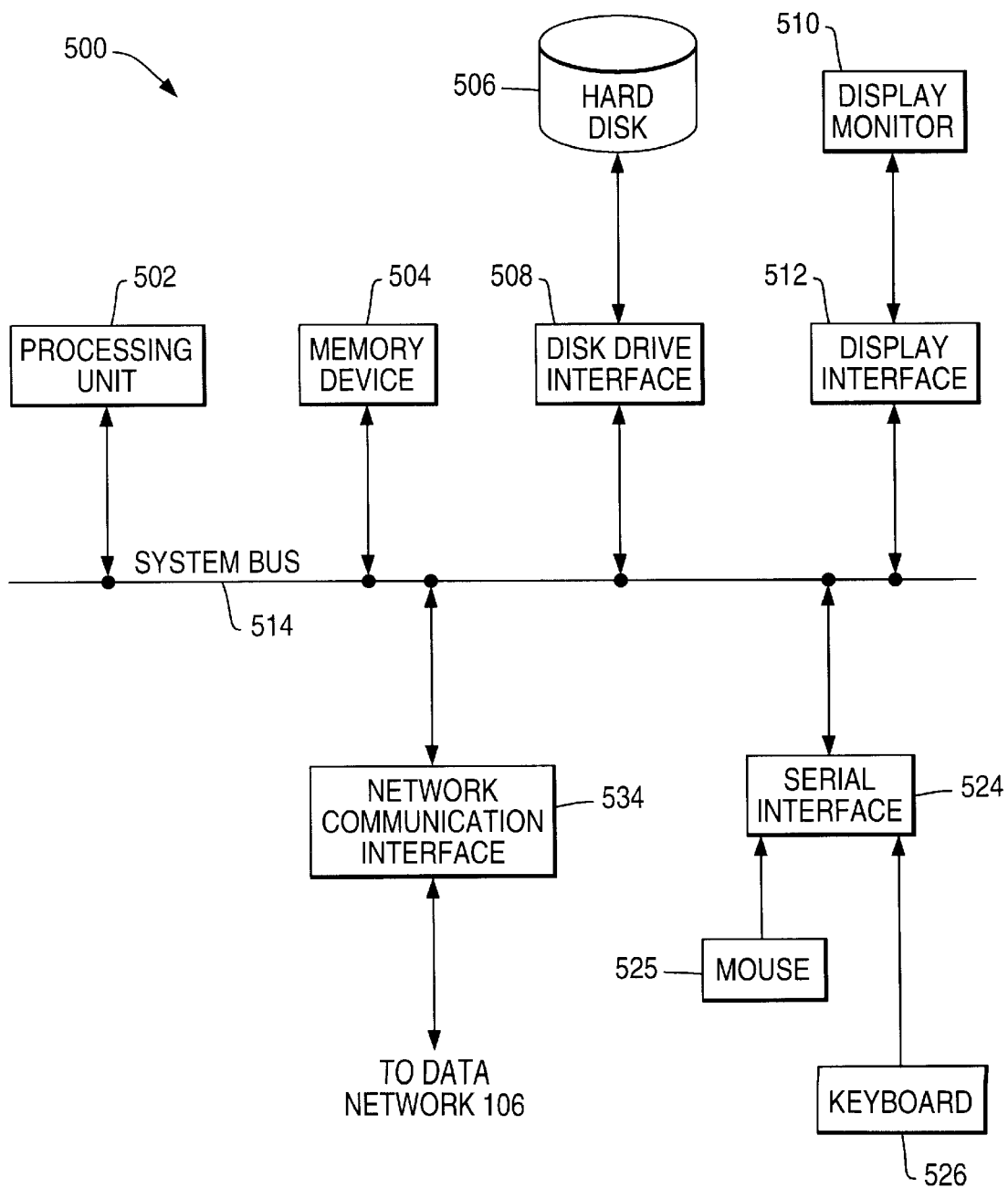
FIG. 5 shows a hardware block diagram of a computer system for supporting web site server 116 in FIG. 1, in accordance with the present invention.

Referring to FIG. 5, there is shown a hardware block diagram of a computer system 500 for supporting web site server 116, in accordance with the preset invention.

As shown in FIG. 5, computer system 500 comprises a processing unit 502, a memory device 504, a hard disk 506, a disk drive interface 508, a display monitor 510, and display interface 512, a serial interface 524, a mouse 525, a keyboard 526, a network communication interface 534, and a system bus 514.

Hard disk 506 is coupled to disk drive interface 508, display monitor 510 is connected to display interface 512, and mouse 525 and keyboard 526 are connected to serial interface 524. Coupled to system bus 514 are: processing unit 502, memory device 504, disk drive interface 508, display interface 512, serial interface 524, and network communication interface 534.

Memory device 504 is able to store programs (including instructions and data). Operating together with disk drive interface 508, hard disk 506 is also able to store programs. However, memory device 504 has faster access speed than hard disk 506, while hard disk 506 has higher capacity than memory device 504.

Operating together with display interface 512, display monitor 510 is able to provide visual interface between programs being executed and a user.

Operating together with serial interface 524, mouse 525 and keyboard 526 are able to provide inputs to computer system 500.

Network communication interface 534 is able to provide an interface between computer 500 and data network 106. More specifically, computer 500 gets data network 106 via network communication interface 434 in compliance with pre-determined network protocols.

Processing unit 502, which may include one or more processors, has access to memory device 504 and hard disk 506, and is able to control operations of computer system 500 by executing programs stored in memory device 504 or hard disk 506 Processing unit 502 is also able to control the transmissions of programs and data between memory device 504 and hard disk 506.

Figure 6:
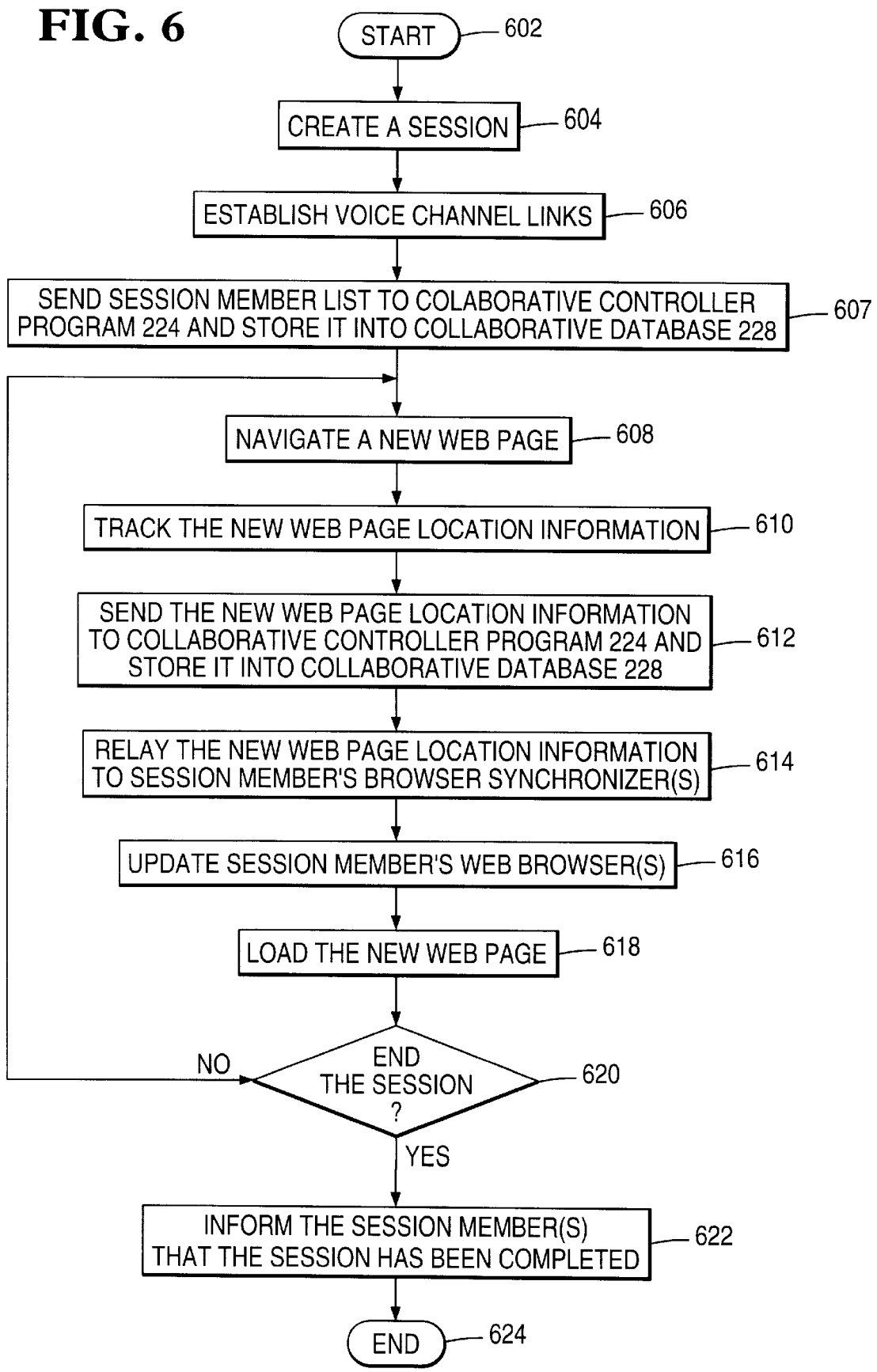
FIG. 6 shows the steps of performing a web site collaborative navigation session by using the embodiment shown in FIG. 2, in accordance with the present invention.

Referring to FIG. 6, there is shown the steps of performing a web site collaborative navigation session by using the embodiment shown in FIG. 2, in accordance with the present invention.

In step 604, a session list is created, which includes the name of the session, the nature (or the objective) of the session, the names of the session members, the network addresses of the session members, and the name and network address of the leading terminal for this session.

In this example, it is assumed that: user 1 uses collaborative application program 202 in terminal $102._1$ to create a session list, including the names and network addresses of terminals $102._1$ and $102._2$; to join the session, user 2 is using terminal $102._2$ to view the web pages that have been navigated by user 1. It is further assumed that, in the session list, terminal $102._1$ is indicated as the leading terminal, and terminal $102._2$ as the following terminal, of the session.

In step 606, collaborative application program 202 establishes voice communication links, among (or between)

session members, by using telephony board 433 via telephone network 108, or by using network communication interface 434 via data network 106, so that the users of the following terminals can verbally communicate with the user of the leading terminal. In this example, collaborative application program 202 establishes voice communication links between terminal 102.$_1$ and 102.$_2$.

In step 607, collaborative application program 202 sends the session list to collaborative controller program 224, via data network 106. Collaborative controller program 224 stores the session list into collaborative database 228.

In step 608, user 1 uses web browser 204 in terminal 102.$_1$ to navigate a new web page from web site 116, via data network 106, or from any of the conventional web sites (112.$_1$, 112.$_2$, . . . , or 112.$_N$).

In step 610, web browser 204 informs browser tracker 208 the location information for the new web page. A specific type of web page location information is called URL (Uniform Resource Locator).

In step 612, browser tracker 208 sends the new web page location information to collaborative controller program 224, via data network 106. Collaborative controller program 224 stores the new web page location information into collaborative database 228.

In step 614, via data network 106, collaborative controller program 224 relays the new web page location information to all browser synchronizer(s) in the following terminal(s) according to the session member list stored in collaborative database 228. In this example, collaborative controller program 224 relays the new web page location information to browser synchronizer 216.

In step 616, the browser synchronizer(s) in the following terminal(s) updates/update its/their respective web browser(s) with the new web page location information. In this example, browser 216 updates web browser 214 with the new web page location information.

In step 618, the web browser(s) in the following terminal(s) loads/load the new web page based on the new web page location information. In this example, web browser 214 loads the new web page based on the new web page location information.

In step 620, collaborative controller program 224 determines whether to end the session. If the determination is negative, the operation is led to step 608 to navigate another new web page. If the determination is positive, the operation is led to step 622.

In step 622, collaborative controller program 224 informs all following terminal(s) that the session has been completed. In this example, collaborative controller program 224 informs terminal 102.$_2$ that the session has been completed.

Figure 7:
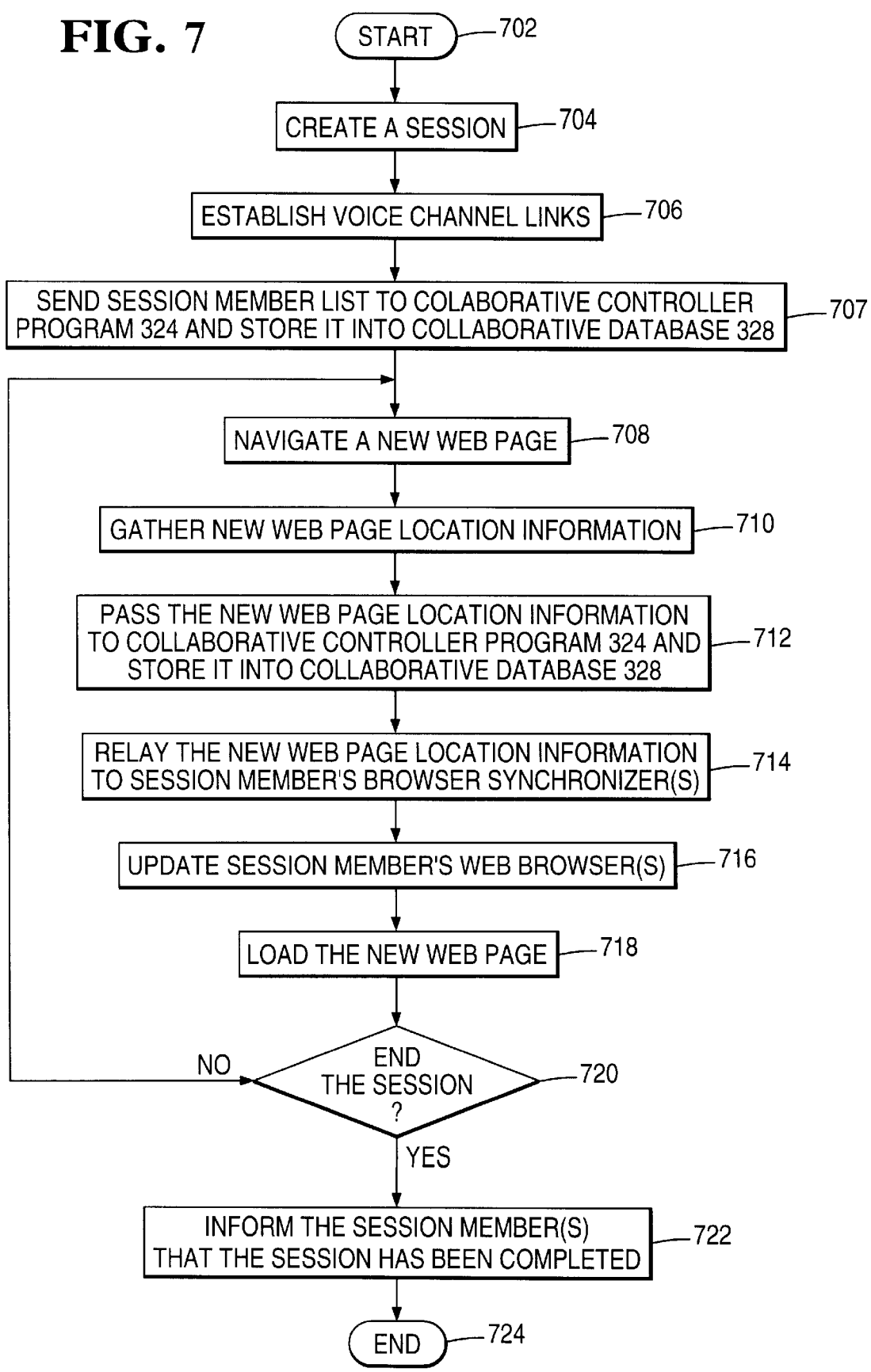
FIG. 7 shows the steps of performing a web site collaborative navigation session by using the embodiment shown in FIG. 3, in accordance with the present invention.

Referring to FIG. 7, there is shown the steps of performing a web site collaborative navigation session by using the embodiment shown in FIG. 3, in accordance with the present invention.

In step 704, a session list is created, which includes the name of the session, the nature (or the objective) of the session, the names of the session members, the network addresses of the session members, and the name and network address of the leading terminal for this session.

In this example, it is assumed that: user 1 uses collaborative application program 302 in terminal 102.$_1$ to create a session list, including the names and network addresses of terminals 102.$_1$ and 102.$_2$; to join the session, user 2 is using terminal 102.$_2$ to view the web pages that have been navigated by user 1. It is further assumed that, in the session list, terminal 102.$_1$ is indicated as the leading terminal, and terminal 102.$_2$ as the following terminal, of the session.

In step 706, collaborative application program 302 establishes voice communication links, among (or between) session members, by using telephony board 433 via telephone network 108, or by using network communication interface 434 via data network 106, so that the users of the following terminals can verbally communicate with the user of the leading terminal. In this example, collaborative application program 302 establishes voice communication links between terminal 102.$_1$ and 102.$_2$.

In step 707, collaborative application program 302 sends the session list to collaborative controller program 324. Collaborative controller program 324 stores the session list into collaborative database 328.

In step 708, user 1 uses web browser 304 in terminal 102.$_1$ to send a server request web site server 322, to request a new web page.

In step 710, browser tracker 323 gathers the new web page location information from the server request, as indicated by line 334. A specific type of web page location information is called URL (Uniform Resource Locator).

In step 712, browser tracker 323 passes the new web page location information to collaborative controller program 324, which then stores it into collaborative database 328.

In step 714, collaborative controller program 224 relays the new web page location information to all browser synchronizer(s) in the following terminal(s) according to the session member list stored in collaborative database 328. In this example, collaborative controller program 324 relays the new web page location information to browser synchronizer 316.

In step 716, the browser synchronizer(s) in the following terminal(s) updates/update its/their respective web browser(s) with the new web page location information. In this example, browser 316 updates web browser 314 with the new web page location information.

In step 718, the web browser(s) in the following terminal(s) loads/load the new web page based on the new web page location information. In this example, web browser 314 loads the new web page based on the new web page location information.

In step 720, collaborative controller program 324 determines whether to end the session. If the determination is negative, the operation is led to step 708 to navigate another new web page. If the determination is positive, the operation is led to step 722.

In step 722, via data network 106, collaborative controller program 224 informs all following terminal(s) that the session has been completed. In this example, collaborative controller program 324 informs terminal 102.$_2$ that the session has been completed.

Figure 8:
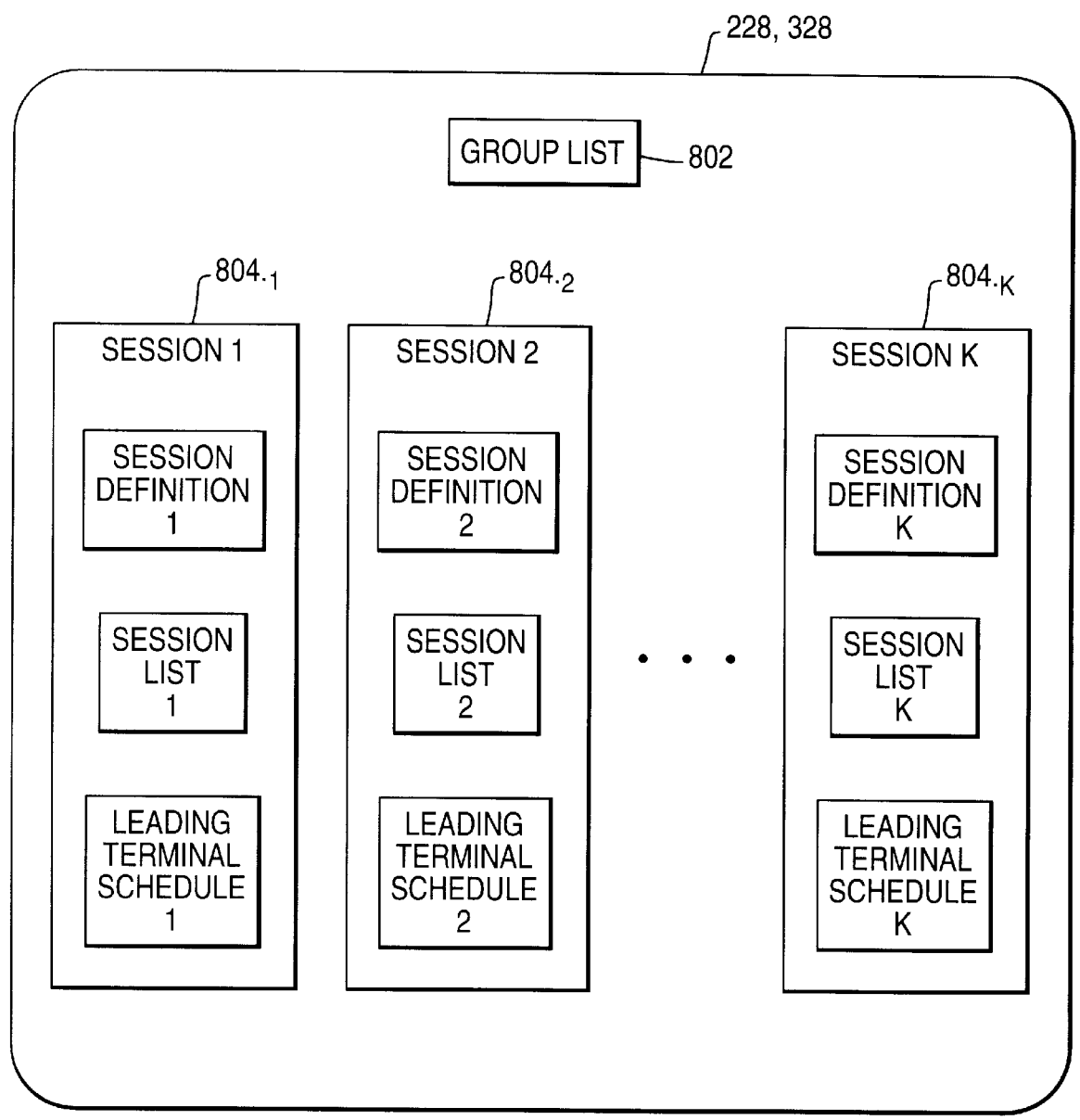
FIG. 8 shows collaborative database 228 or 238 in greater detail, in accordance with the present invention.

Referring to FIG. 8, there is shown the collaborative database (228 or 238) in greater detail, in accordance with the present invention.

As shown in FIG. 8, the collaborative database includes group list 802 and a plurality of sessions (804.$_1$, 804.$_2$, . . . , 804.$_K$). Group list 802 contains the names and network addresses for the user terminals (102.$_1$, 102.$_2$, . . . , 102.$_M$). Each of the sessions contains a session definition, a session list for the session, and leading terminal schedule. A session definition includes the information relating to: the name, the nature (or objective), the time schedule, and other general information, about the session. A session list includes the names and network addresses of the session members (or session terminals). A leading terminal schedule includes the name(s) and network address(es) of the user terminal(s) that will act as leading terminal(s) for the associated session. If a number of user terminals will act as leading terminals in a sequential order, the leading terminal schedule indicates the order, according to which the terminals take the responsibility as leading terminals. If two or more terminals will act as leading terminals according to a specific time schedule, the leading terminal schedule indicates the time period for each of the terminals, in which a user terminal for that time period takes the responsibility as leading terminals. An administrative personnel can update or edit collaborative database 228 or 328 by using mouse 525 or keyboard 526.

Figure 9:
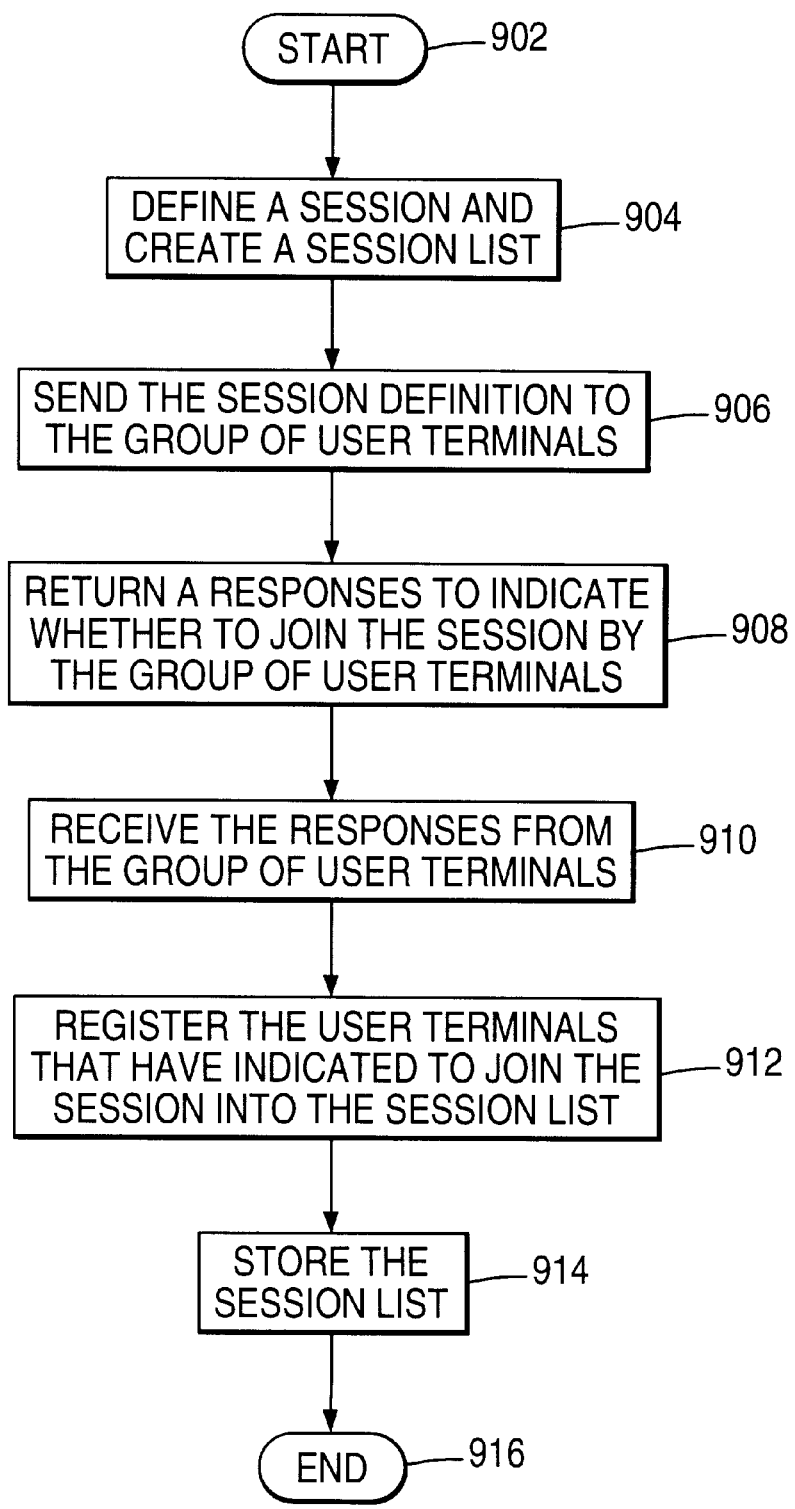
FIG. 9 shows a flowchart illustrating the steps of registering session members into one or more session lists, in accordance with one embodiment of the present invention.

Referring to FIG. 9, there is shown a flowchart illustrating the steps of registering session members into one or more session lists, in accordance with one embodiment of the present invention.

As shown in FIG. 9, step 904 defines a session (assuming that session 1 is defined). There are two methods to define a session. In the first method, a user can use collaborative application program in a user terminal (e.g. 104.$_1$ or 104.$_2$) to define the session, and then send the session definition to collaborative controller program. In a second method, a user can use keyboard 525 and mouse 526 to input a session definition to the collaborative controller program (224 or 324) via the user graphical interface (225 or 325). In this example, it is assumed that the defined is session definition 1 (804.$_1$).

In step 906, collaborative controller program 224 or 324 sends the session definition in session 1 to the collaborative application programs in the group of user terminals (102.$_1$, 102.$_2$, ..., 102.$_M$) based on the network addresses in group list 802. Sent together with the definition of session 1 is a prompt to inquire whether any of the user terminals desires to join session 1.

In step 908, upon receiving the definition of session 1, the collaborative application program in each of the user terminals responds to the inquiry, and returns the response to indicate whether to join session 1.

In step 910, collaborative controller program 224 or 324 receives the responses from each of the group of user terminals.

In step 912, collaborative controller program 224 or 324 registers the user terminals that have indicated to join session 1 into the session list in session 1.

In step 914, collaborative controller program 224 or 324 stores the session list of session 1 into collaborative database 228 or 328.

Figure 10:
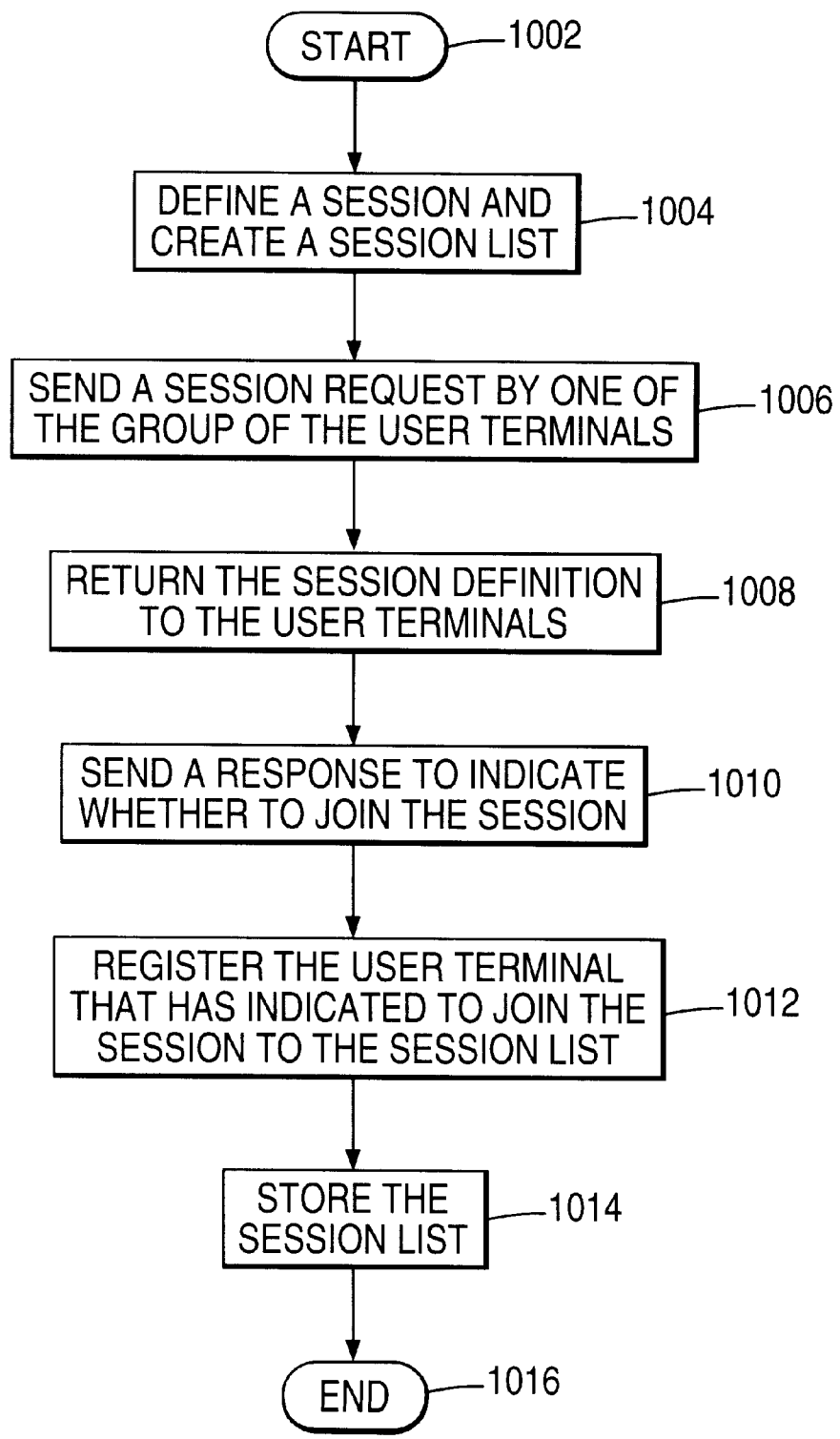
FIG. 10 shows a flowchart illustrating the steps of registering session members into one or more session lists, in accordance with another embodiment of the present invention.

Referring to FIG. 10, there is shown a flowchart illustrating the steps of registering session members into one or more session lists, in accordance with another embodiment of the present invention.

As shown in FIG. 10, step 1004 defines one or more sessions. In this example, it is assumed that sessions 1–K are defined. There are two methods to define a session as described in step 904.

In step 1006, the collaborative application program in one of the user terminals, such as any of the user terminals (102.$_1$, 102.$_2$, ..., 102.$_M$), sends a session request to collaborative controller program 224 or 324.

In step 1008, upon receiving the request, collaborative controller program 224 or 324 sends the definitions for sessions 1–K to the user terminal that has sent the session request. Sent together with each of the session definitions is a prompt to inquire whether any of the user terminals desires to join session 1, 2, . . . , or K.

In step 1010, the collaborative application program in the user terminal (that has sent the session request) receives the session definitions, responds to each of the prompts in the session definitions, and returns the responses to collaborative controller program 224 or 324 to indicate to join which of the sessions.

In step 1012, collaborative controller program 224 or 324 registers the user terminal into the session list(s) for the respective session(s) to which the user terminal has indicated to join.

In step 1014, collaborative controller program 224 or 324 stores the session list(s) that needs/need to update into collaborative database 228 or 328.

Figure 11:
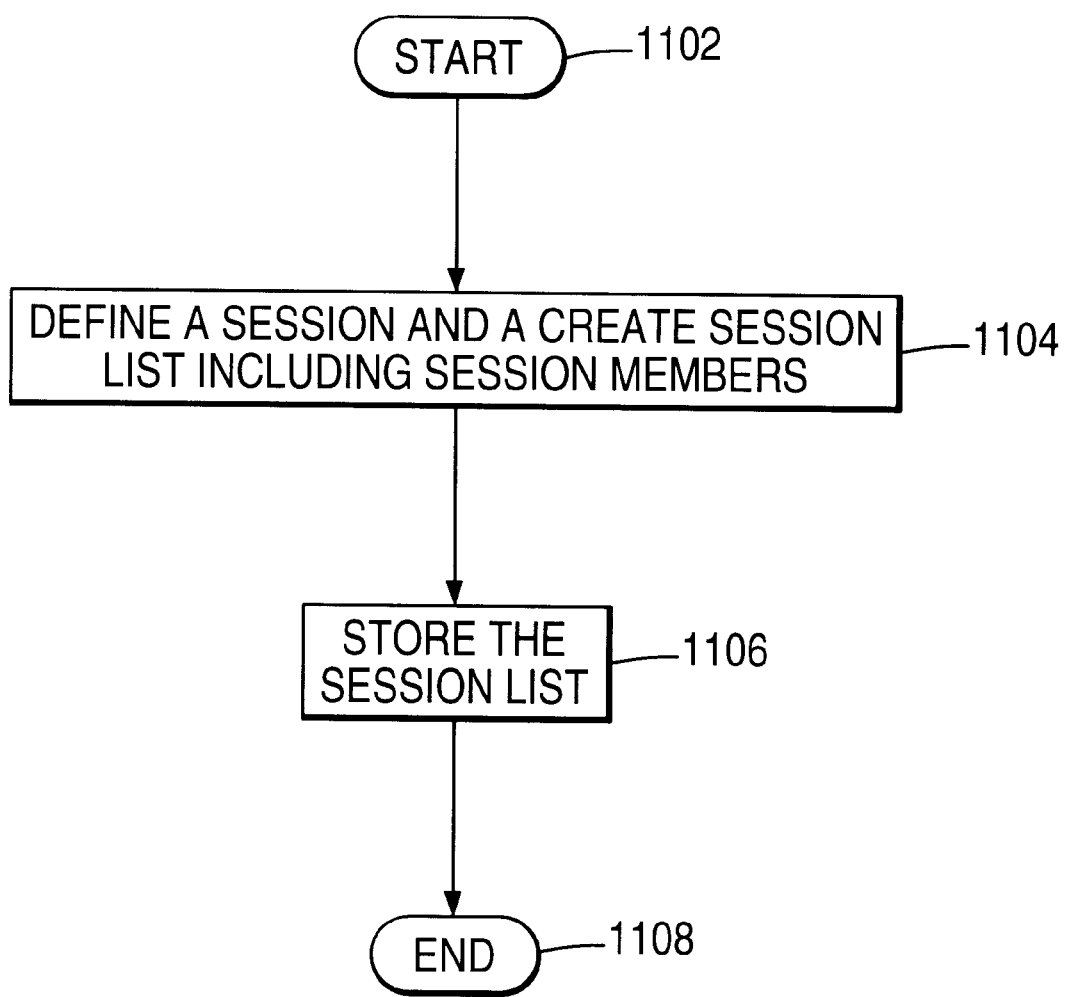
FIG. 11 shows a flowchart illustrating the steps of registering session members into one or more session lists, in accordance with still another embodiment of the present invention.

Referring to FIG. 11, there is shown a flowchart illustrating the steps of registering session members into one or more session lists, in accordance with still another embodiment of the present invention.

As shown in FIG. 11, step 1104 defines one or more sessions. In this example, it is assumed that sessions 1–K are defined. There are two methods to define a session as described in step 904. Step 1104 also specifies the names and network address for each of the respective session lists.

In step 1106, collaborative controller program 224 or 324 stores session definitions, together with their respective session lists into collaborative database 228 or 328.

Figure 12:
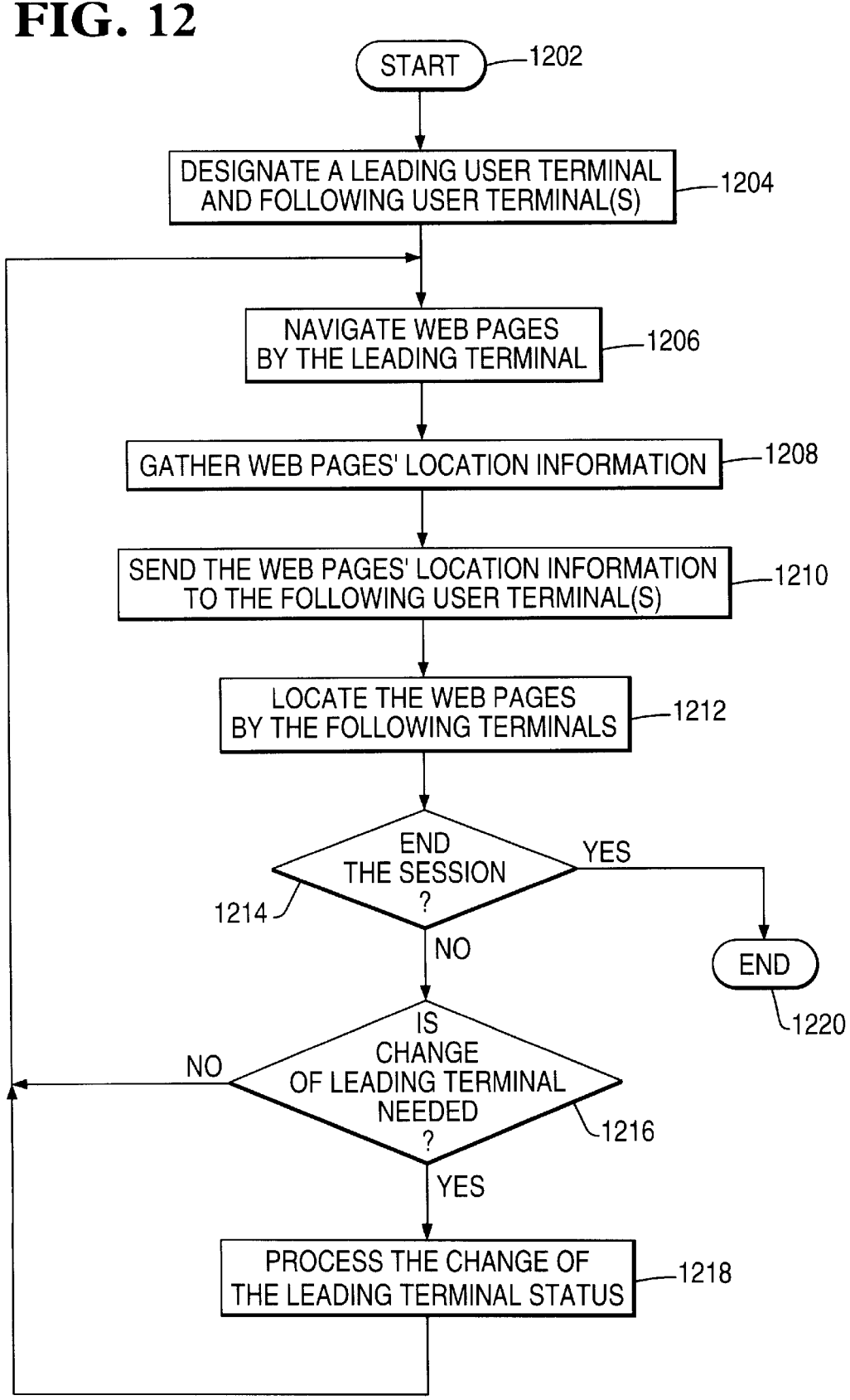
FIG. 12 shows a flowchart illustrating the steps of exchanging information located from web sites among user terminals, in accordance with still another embodiment of the present invention.

Referring to FIG. 12, there is shown a flowchart illustrating the steps of exchanging information retrieved from web sites among user terminals, in accordance with one embodiment of the present invention.

As shown in FIG. 12, step 1204 designates a leading terminal among the session members in a session list (see FIG. 8), and designates the rest of the session members in the session list as following terminal(s). In this example, it is assumed that user terminal 102.$_1$ is designated as the leading terminal.

In step 1206, a user uses web browser 204 or 304 in user terminal 102.$_1$ to navigate web pages.

In step 1208, collaborative controller program 224 or 324 gathers web pages' location information.

In step 1210, collaborative controller program 224 or 324 sends the web pages' location information to the following terminal(s).

In step 1212, the following terminal(s) locates/locate the web pages based on the web page location information.

In step 1214, collaborative controller program 224 or 324 determines whether to end the session. If the determination is led to step 1220 to end the session. If the determination is negative, the operation is led back to step 1206, to locate new web pages.

In step 1216, collaborative controller program 224 or 324 determines whether change of the leading terminal status is needed. A number of events require to change the leading terminal status within a session. For example, a session can be presented by different people having different expertise at different user terminals. In this situation, when the user at the current leading terminal has completed his/her presentation, he/she will send a request to end his/her leading status. The session may be presented by several people having different available time schedule at different user terminals. In this situation, collaborative controller program 224 or 234 will periodically check the leading terminal schedule for the associated session. When the time for the current leading terminal expires, collaborative controller program 224 or 234 will find next available leading terminal. Or, during a session, a user at a following terminal may have questions and want to navigate the web pages in question to the leading terminal. In this situation, the following terminal will send a request to interact with the leading terminal. In any of the three situations, a change of the leading terminal status is needed.

In step 1216, if the determination is negative, the operation is led to step 1206, to locate new web pages without changing the current leading terminal. If the determination is positive, the operation is led to step 1218, to process the change of the leading terminal status. Then, the operation is led back to step 1206, to locate new web pages.

Figure 13:
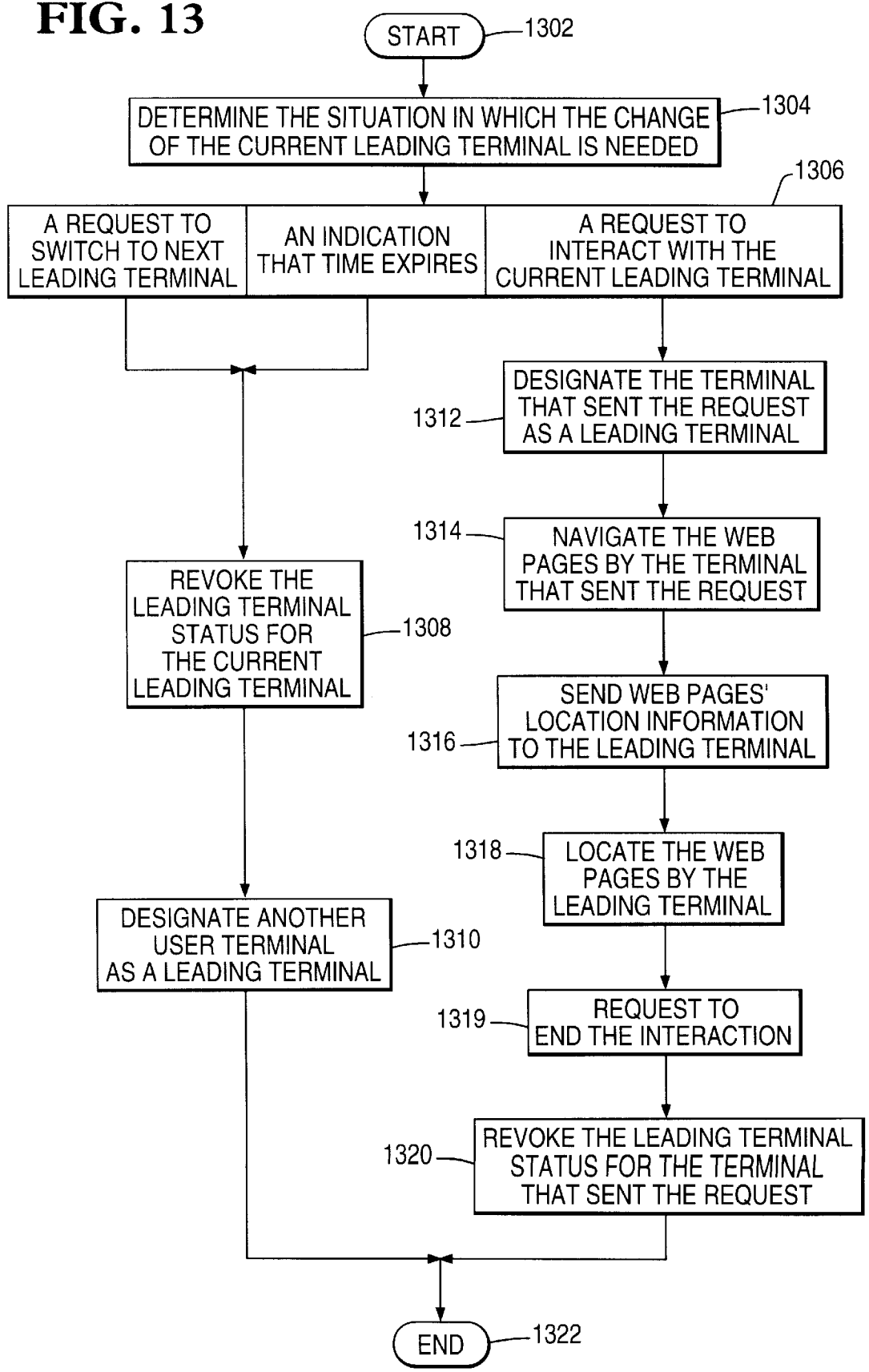
FIG. 13 shows the specific steps of step 1218 in FIG. 12, in accordance with the present invention.

Referring to FIG. 13, there is shown the specific steps within step 1218, in accordance with the present invention.

In step 1304, collaborative controller program 224 or 324 determines the situation in which the change of the current leading terminal is needed.

As shown in box 1306, there are three situations in which the change of the current leading terminal is needed: (1) in response to a request from a following terminal to interact with the current leading terminal, the operation is led to step 1312; (2) in response to a request from the current leading terminal to switch the leading terminal status to another terminal; and (3) in response to an indication that the time for the current leading terminal has expired, the operation is led to step 1308. The two users at the leading and following terminals can generate a request by click an "request" button on the display monitors at their respective terminals.

In step 1308, collaborative controller program 224 or 324 revokes the leading terminal status from the current leading terminal.

In step 1310, collaborative controller program 224 or 324 designates a user terminal as the leading terminal according to the leading terminal schedule associated with the current session in collaborative database 224 or 324.

In response to a request from a following terminal as shown in box 1306, in step 1312, collaborative controller program 224 or 324 designates the following terminal that sent the request as a "temporal" leading terminal.

In step 1314, the following terminal that sent the request navigates the web pages in question.

In step 1316, collaborative controller program 224 or 324 gathers the web pages' location information and send it to the leading terminal.

In step 1318, the leading terminal locates the web pages according to the location information. The users at the leading terminal and the following terminal can orally communicate with each other by using the telephone sets shown in FIG. 1.

In step 1319, either the leading terminal or the following terminal is able to generate a request to end the interaction.

In step 1320, collaborative controller program 224 or 324 revokes the "temporal" leading terminal status from the following terminal that sent the request.

In the present invention, the software functions in user terminal 102.₁ or 102.₂ are preferably stored in memory 404 or hard disk 406. The software functions in web site 116 are preferably stored in memory 404 or hard disk 406.

While the invention has been illustrated and described in detail in the drawing and foregoing description, it should be understood that the invention may be implemented through alternative embodiments within the sprit of the present invention. Thus, the scope of the invention is not intended to be limited to the illustration and description in this specification, but is to be defined by the appended claims.

What is claimed is:

1. A method of synchronizing a plurality of web browsers using a collaborative program, each of the plurality of web browsers on a separate computer, comprising:

navigating one or more web sites having at least one web page with a leading one of the web browsers on a leading computer, each of the sites having a location;

synchronizing at least one of the plurality of web browsers with the leading one of the web browsers and displaying the at least one web page on the at least one synchronized web browser using the collaborative program without human intervention; and establishing voice communication links between each of the users of the web browsers using the collaborative program and transmitting voice data over said voice communication links.

2. The method of claim 1, comprising sending location information from the leading web browser to a collaborative controller, the collaborative controller then forwarding the location information to at least one of the other computers having a web browser.

3. The method of claim 1, comprising gathering session definitions and session lists from at least one of the computers, and sending the gathered session definitions and session lists to at least one of the other computers.

4. The method of claim 1, wherein the leading computer includes the collaborative controller.

5. The method of claim 1, wherein each of the web sites is on a local data network.

6. The method of claim 2, wherein the collaborative controller maintains a collaborative database including at least one of the following:

a) a session definition;

b) a session list; and c) a leading terminal schedule.

7. The method of claim 6, wherein the session definition includes information indicative of the names of users joined into the session and a time schedule for the session.

8. The method of claim 6, wherein the session list includes the names and network addresses of one of the session numbers and session terminals.

9. The method of claim 6, wherein the leading terminal schedule includes the names and network addresses of the user terminals which will act as leading terminals during the session.

10. The method of claim 6, comprising indicating by a following computer to the leading computer that the following computer is joining a session.

11. A method of synchronizing web browsers on a group of user terminals using a collaborative program, comprising:

designating one of user terminals as a leading terminal;

navigating through web pages having at least one web page with the leading terminal using the web browser;

relaying location information of the browsed web pages to at least one following web browser of the group of user terminals using the collaborative program and displaying the at least one web page on the at least one synchronized web browser without human intervention; and establishing voice communication links between each of the users of the web browsers using the collaborative program and transmitting voice data over said voice communication links.

12. The method of claim 11, comprising creating a session list including the names and addresses of the session members including the leading terminal and the at least one following terminal.

13. The method of claim 11, comprising providing the name and address of the leading terminal.

14. The method of claim 11, comprising establishing communication links between each of the user terminals.

15. The method of claim 12, wherein said relaying step is performed by relaying location information to each of the session members.

16. A computer architecture for synchronizing a plurality of web browsers using a collaborative program, each of the plurality of web browsers on a separate computer, said computer architecture comprising:

navigating means for navigating one or more web sites having at least one web page with a leading one of the web browsers on a leading computer, each of the sites having a location;

synchronizing means for synchronizing at least one of the plurality of web browsers with the leading one of the web browsers and displaying the at least one web page on the at least one synchronized web browser without human intervention; and establishing means for establishing voice communication links using the collaborative program between each of the users of the web browsers using the collaborative program and transmitting voice data over said voice communication links.

17. A computer system for synchronizing a plurality of web browsers using a collaborative program, each of the plurality of web browsers on a separate computer, the computer system comprising:

a processor; and a memory coupled to said processor, the memory having stored therein sequences of instructions, which, when executed by said processor, cause said processor to perform the steps of:

navigating one or more web sites having at least one web page with a leading one of the web browsers on a leading computer, each of the sites having a location;

synchronizing at least one of the plurality of web browsers with the leading one of the web browsers and displaying the at least one web page on the at least one synchronized web browser without human intervention; and establishing voice communication links between each of the users of the web browsers using the collaborative program and transmitting voice data over said voice communication links.

* * * * *